United States Patent [19]
Port et al.

[11] Patent Number: 6,041,822
[45] Date of Patent: Mar. 28, 2000

[54] REDUCTION OF ELECTROSTATIC CHARGING OF PARTICLES IN PNEUMATIC CONVEYING SYSTEMS

[75] Inventors: Benoit Port, Sisteron, France; Cedric Briens; Ion Inculet, both of London, Canada

[73] Assignee: The University of Western Ontario, London, Canada

[21] Appl. No.: 09/088,769

[22] Filed: Jun. 2, 1998

Related U.S. Application Data

[60] Provisional application No. 60/048,322, Jun. 2, 1997.

[51] Int. Cl.[7] ............................................. F15D 1/02
[52] U.S. Cl. ........................ 138/39; 138/92; 138/177; 138/178
[58] Field of Search .................. 138/39, 92, 177, 138/178; 285/16, 48, 179.1, 179.2

[56] References Cited

U.S. PATENT DOCUMENTS

| | | | |
|---|---|---|---|
| 1,006,260 | 10/1911 | Mueller et al. | 138/92 |
| 2,622,937 | 12/1952 | Taylor | 285/16 |
| 2,955,851 | 10/1960 | Scott | 285/179.1 |
| 3,977,730 | 8/1976 | Seick | 138/92 |
| 4,130,300 | 12/1978 | Sheridan | 285/16 |
| 4,865,353 | 9/1989 | Osborne | 285/16 |
| 5,005,428 | 4/1991 | Tanis | 138/39 |
| 5,275,440 | 1/1994 | Esser | 285/16 |

*Primary Examiner*—James Hook
*Attorney, Agent, or Firm*—R. Craig Armstrong

[57] ABSTRACT

Tribo-electrification of conveyed particles in a pipeline of a pneumatic conveying system is reduced by electrically isolating at least one portion of the inner surface of the pipeline, preferably the concave interior surface of at least one elbow. The isolated portion acquires an electric charge of opposite polarity to that of the conveyed particles.

11 Claims, 6 Drawing Sheets

REDUCTION OF ELECTROSTATIC CHARGING OF PARTICLES IN PNEUMATIC CONVEYING SYSTEMS

REFERENCE TO RELATED APPLICATION

This is a formal application based on United States provisional application Ser. No. 60/048,322, filed Jun. 2, 1997, and claiming the benefit of the filing date of that application.

BACKGROUND OF THE INVENTION

This invention relates to a means of minimizing the tribo-electrification of conveyed particles in a pneumatic conveying system.

In most pneumatic conveying systems, electrostatic charges are produced by the known phenomenon of tribo-electrification, generated between the conveyed particles and the pipeline walls. In certain systems, charged particles could lead to safety hazards or processing problems, and accordingly it is highly desirable to reduce charging.

Whether the pipelines are made out of metal or plastic materials, the tribo-electrification of particles continues indefinitely. Metallic pipelines, when connected to ground, ensure the complete discharge of the tribocharge developed on the interior surfaces. However, in the case of plastic pipelines, the charges on the inside surfaces could reach very high values. In a cylindrical geometry, unless the electric charges on the inside surfaces of the pipe relax sufficiently to maintain a steady state, the surface charges continue to build up, leading either to eventual breakdown through the pipe wall or to spark discharges along the inside surfaces to the nearest ground.

Tribo-electrification has the following known characteristics:

1. A flat metallic plate isolated from the ground, when continuously bombarded by particles of a different work function, will gradually acquire a charge which reaches a maximum depending on the electric field which is generated at the surface of the plate.

2. A dielectric plane surface will behave similarly to a metallic plate. When the surface electric field of the dielectric reaches a certain value, the tribo-electrification stops and the surface charge is maintained at that maximum value.

3. A long cylindrical dielectric surface will continue indefinitely to acquire surface charges which eventually will lead to breakdown. The reason for that is that the electric field on the inside surface of a long cylinder is zero and hence it does not impede the tribo-electrification.

SUMMARY OF THE INVENTION

Experiments carried out at the Applied Electrostatics Research Centre of the University of Western Ontario in London, Ontario, Canada have demonstrated that most of the tribo-electrification occurs at the elbows of a pneumatic conveying system. In the invention, by electrically isolating an interior surface of the pipeline, preferably the concave inner surface of an elbow, and allowing it to acquire an electric charge of opposite polarity to that of the conveyed particles, the tribo-electrification at the point of contact between the particles and the isolated surface is stopped. An experimental conveying system approximately 11 meters long containing four such elbows decreased the total charge on the particles by approximately a factor of ten in one example.

The electrical phenomena which account for the reduction are explained by the intensity of the electric field which is developed at the surfaces of the isolated portions.

Thus the invention provides a method for reducing tribo-electrification of particles in pneumatic conveying systems, including the step of providing an interior surface of the pipeline with at least one portion thereof, preferably the concave inner surface of an elbow, which is electrically isolated from surrounding portions thereof. Each such portion acquires an electric charge of opposite polarity to that of conveyed particles, thereby reducing electrostatic charge buildup.

The invention also provides a tribo-electrification reducing conveying system including a cylindrical pipeline having at least one portion of the interior surface thereof, preferably the concave inner surface of an elbow, electrically isolated from the surrounding pipeline.

The electrically isolated portions preferably are of materials such as Teflon (trademark), stainless steel, or steel covered with an insulated polyamide material such as Rilsan (trademark).

Further features of the invention will be described or will become apparent in the course of the following detailed description.

BRIEF DESCRIPTION OF THE DRAWINGS

The invention will now be described in detail, with reference to the accompanying drawings of the preferred embodiment by way of example, in which.

DETAILED DESCRIPTION OF THE PREFERRED EMBODIMENT

Figure 4:
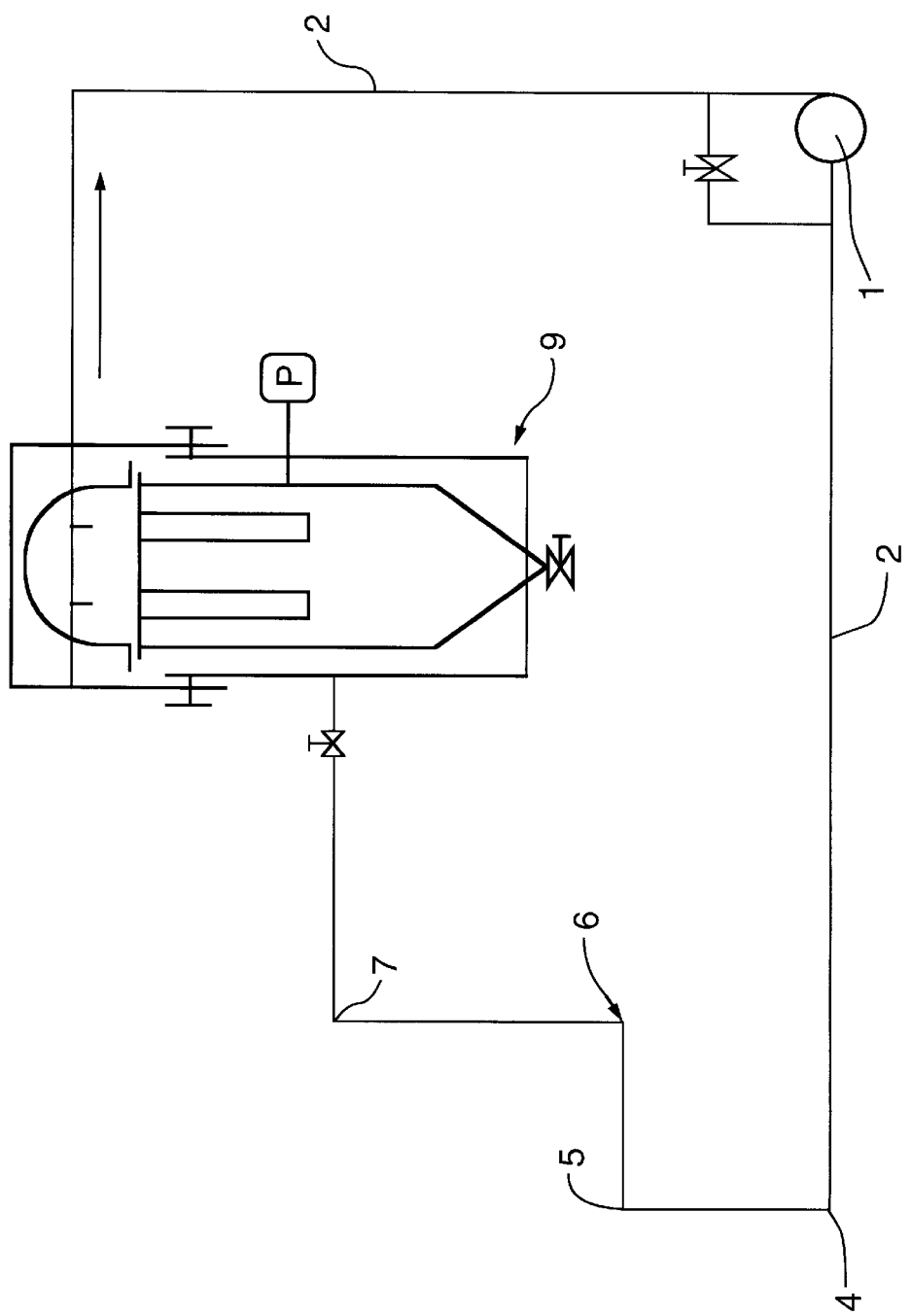
FIG. 4 is a schematic drawing of the preferred embodiment of the experimental system.

The invention is explained most simply by describing the experimental apparatus which was used to prove the concept of the invention. The preferred embodiment of the experimental tribo-electrification reducing conveying system, as shown in FIG. 4, comprised a particle blower 1 and an approximately 11 meter long cylindrical pipeline 2, designed to simulate a particle conveying system. For each experiment, the system conveyed a 50 kilogram batch of particles 3 at a rate of 475 kilograms per hour with an air flow of 180 cubic meters per hour. The pipeline contained four electrically isolated elbows 4–7, each interior concave surface 8 of which was electrically isolated and replaceable. The pipeline then led into a large double Faraday pail 9. The tribo-charge generated on the electrically isolated concave portion of the elbows was calculated from the recorded electric current developed at three locations along the pipeline, namely at a lower elbow 4, an intermediate elbow 5, and an upper elbow 7. The apparatus had provision for replacing the electrically isolated, concave portions with different materials such as Teflon (trademark), stainless steel and steel surfaces covered with insulated plastic such as Rilsan (trademark), a superpolyamide.

Figure 1:
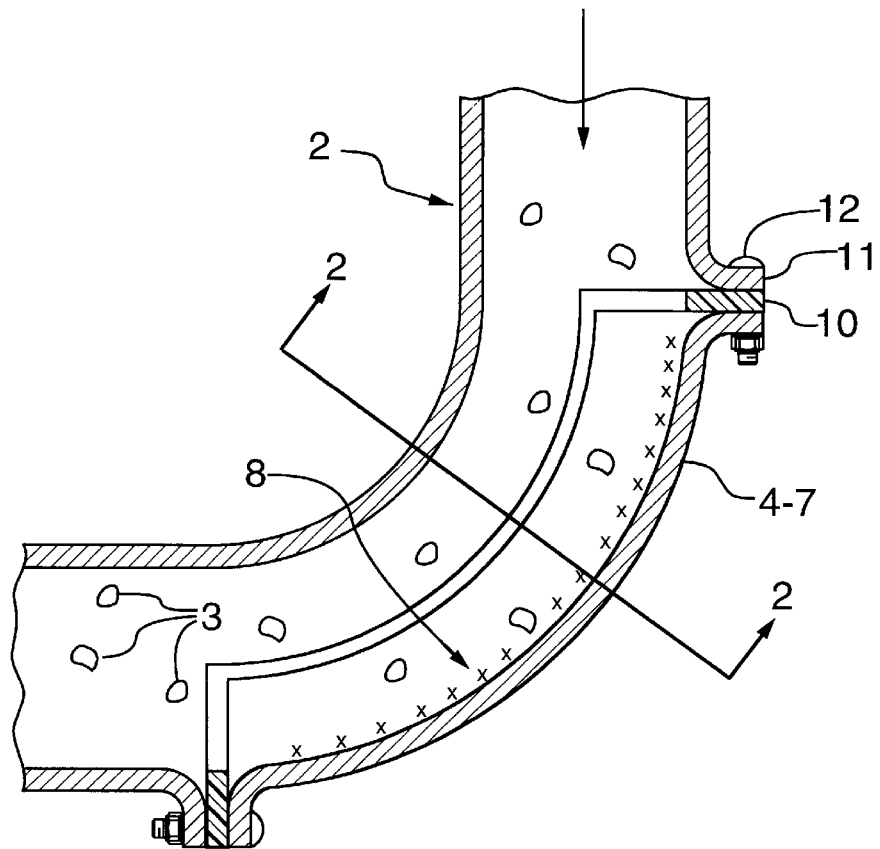
FIG. 1 is cross section of the preferred embodiment of an elbow portion of the pipeline of the tribo-electrification reducing conveying system.
Figure 2:
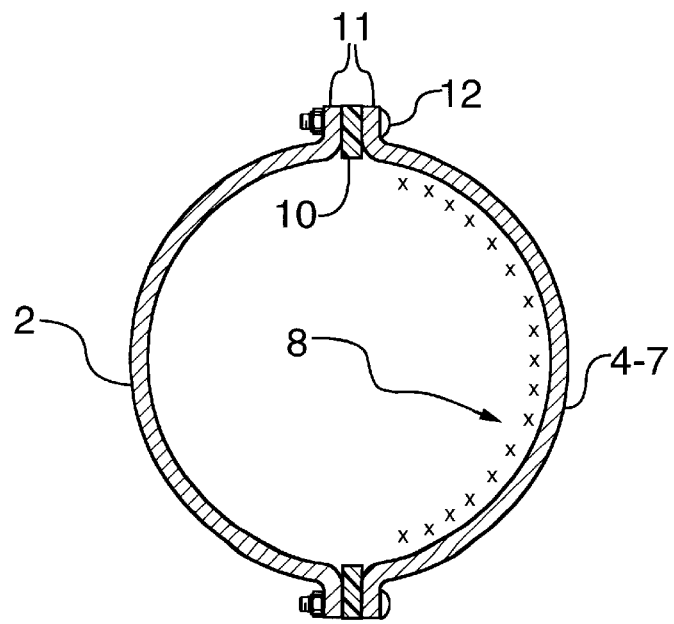
FIG. 2 is a cross section at 2—2 of FIG. 1.
Figure 3:
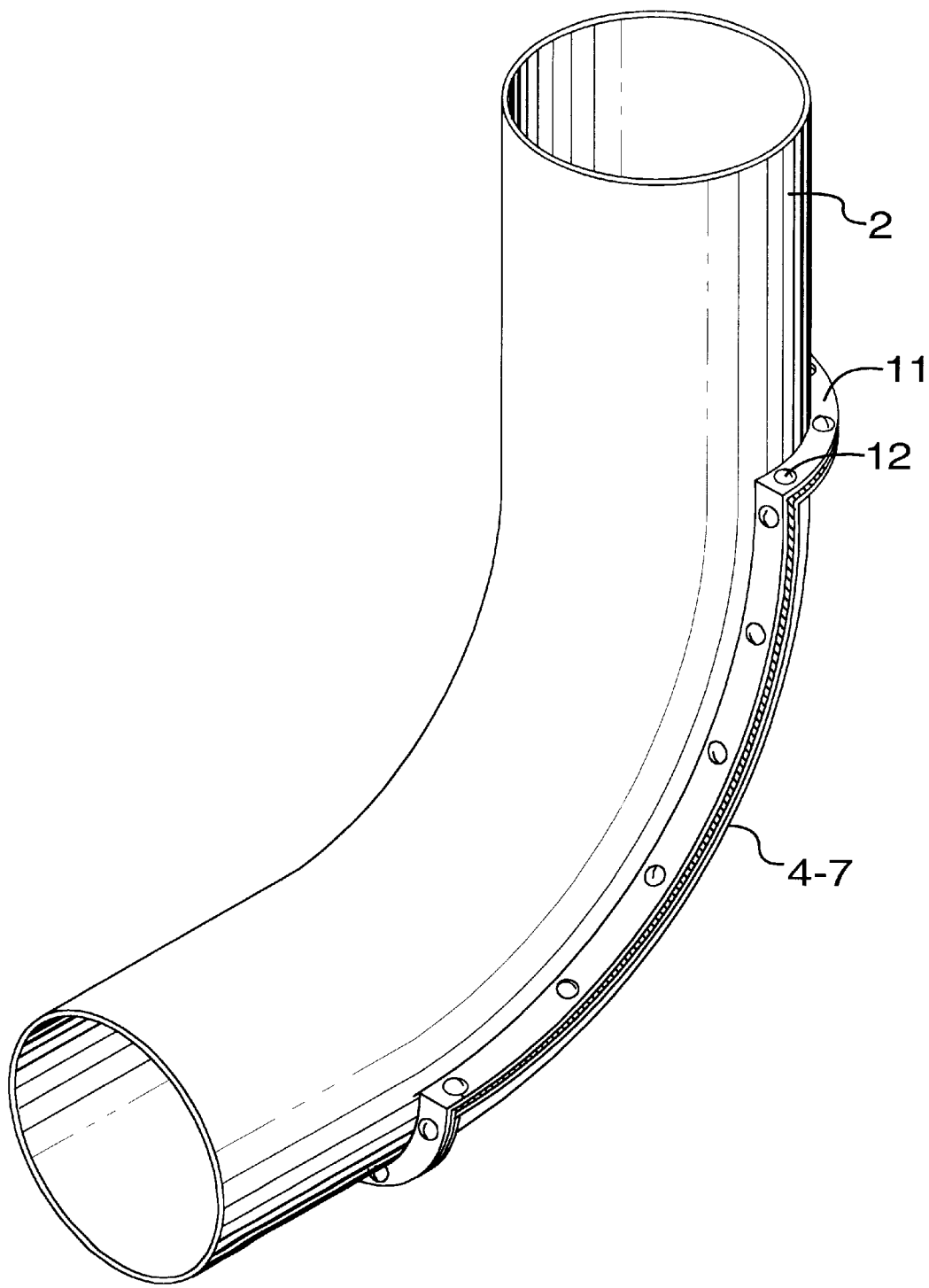
FIG. 3 is a perspective of the preferred embodiment.

Electrical isolation was achieved by the use of an insulating material 10 positioned between the elbows and the rest of the pipeline, held in place between flanges 11 by a plastic bolt 12, as shown in FIGS. 1 and 2.

In the experimental apparatus, a reduction in charge on the conveyed particles by approximately a factor of ten was observed. This reduction was achieved by electrically isolating the portions of the concave interior surface 8 of the elbows of the pipeline 2 as shown in FIGS. 1 and 2, thus allowing the portions to acquire an electric charge of opposite polarity to that of the conveyed particles. As a result, the tribo-electrification at the point of contact between the particles and the isolated surface was stopped.

Figure 5:
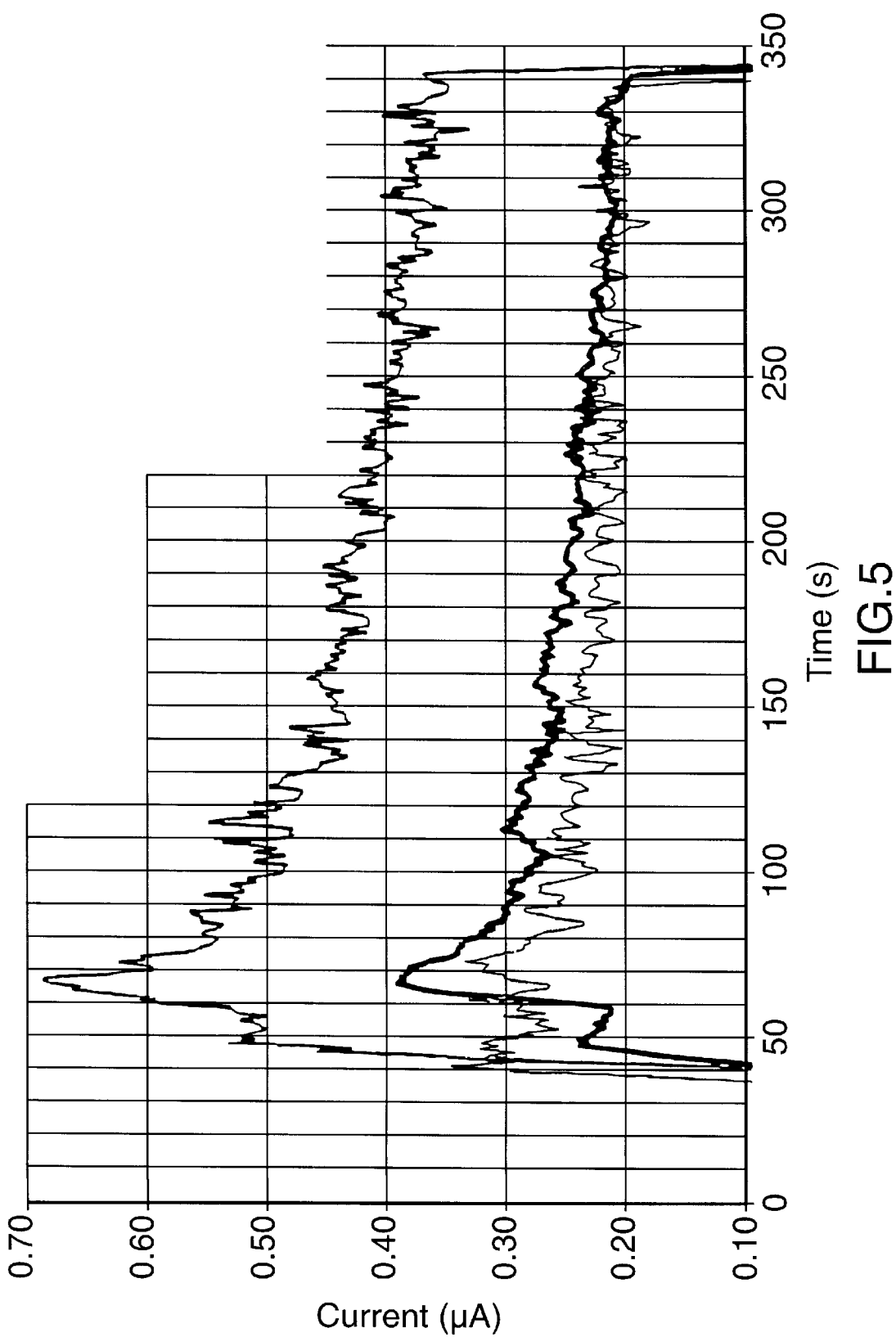
FIG. 5 is a graph showing the electrical current vs. time, as measured at the elbows.
Figure 6:
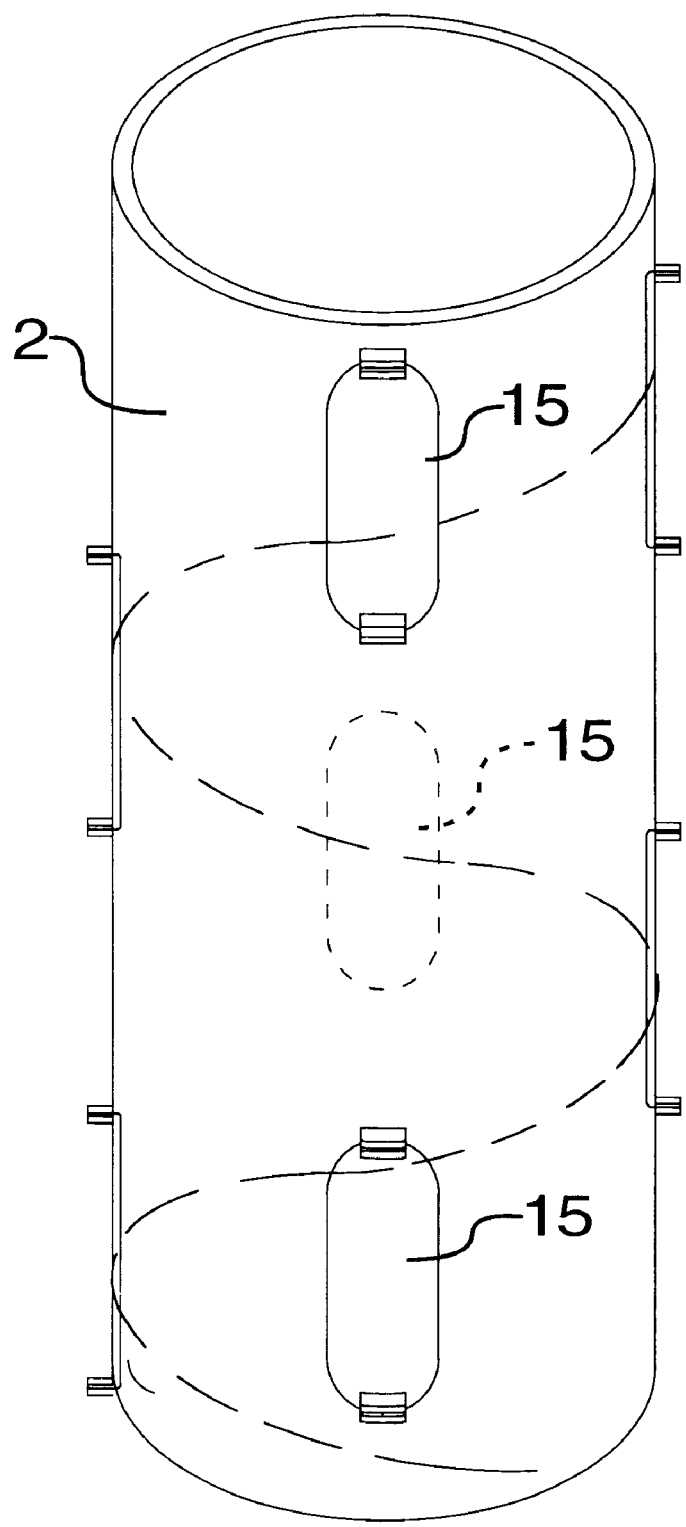
FIG. 6 is a perspective view of a straight portion of the pipeline of an alternative embodiment of the system, having portions electrically isolated in a spiral configuration on the interior surface of the pipeline.
Figure 8:
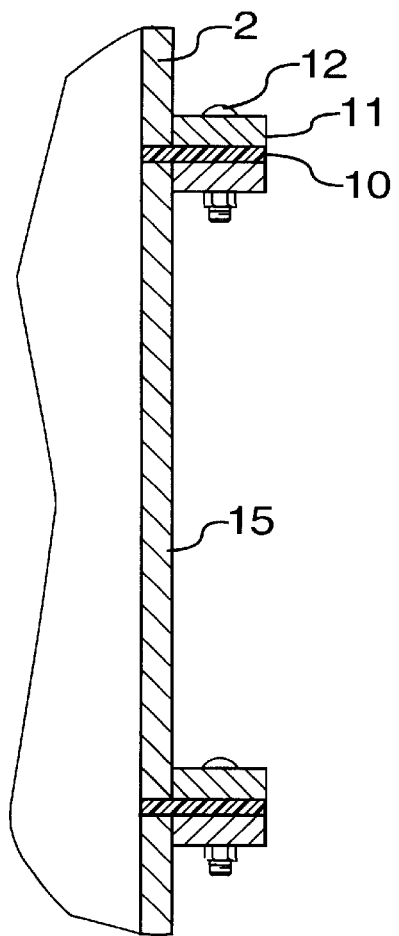
FIG. 8 is a cross section at 8—8 of FIG. 7.
Figure 7:
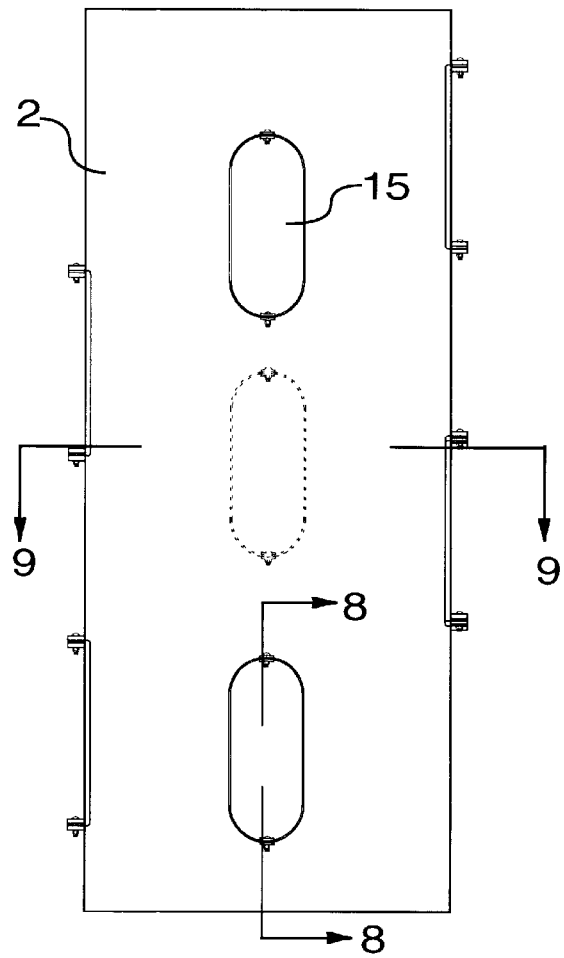
FIG. 7 is a side view corresponding to FIG. 6.
Figure 9:
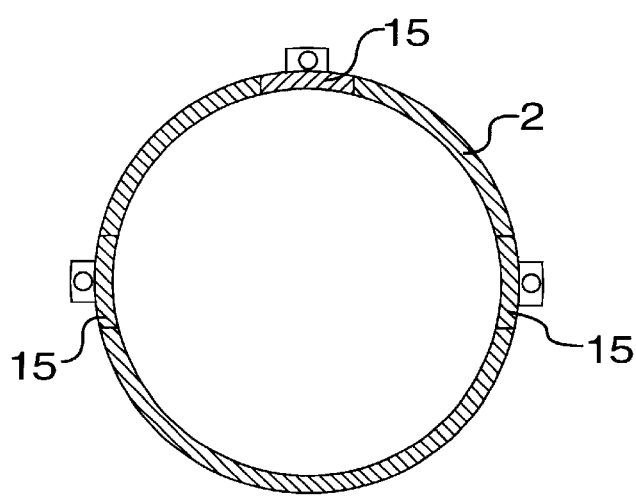
FIG. 9 is cross section at 9—9 of FIG. 7.

Some of the experimental results are shown in Tables A and B, as well as FIG. 5, which follow. For all experiments, the temperature was 50° C.; the mass of the particles conveyed was 50 kg, flowing at 475 kg/h, and the flow of gas was 180 m$^3$/h.

TABLE A

| Standard System - Regular Elbows - Used as Reference | | |
|---|---|---|
| Total charge collected in the Faraday pail | | −452.7 μC |
| Charges Calculated from the Currents Generated at the Elbows | Lower Elbow 4 | +163 μC |
| | Intermediate Elbow 5 | +125 μC |
| | Upper Elbow 7 | +112 μC |

TABLE B

| | Experiment #16 Lower Elbow 4 with Teflon | Experiment #21 Lower Elbow 4 with Stainless Steel | Experiment #22 Lower Elbow 4 with Rilsan | Experiment #23 All Elbows with Rilsan | Notes |
|---|---|---|---|---|---|
| Total Charge collected in the Faraday pail μC | −287.7 | −203.3 | −182.7 | −29.9 | Measured with the Electrometer |
| Lower Elbow 4, μC | 34 | 25 | 86 | 75 | Calculated from the Currents Generated at the Elbows |
| Intermediate Elbow 5, μC | 140 | 63 | 31 | 0 | |
| Upper Elbow 7, μC | 77 | 79 | 25 | −86 | |

The experimental work in relation to this invention, as shown above, has demonstrated that:

1. In pneumatic conveying systems the elbows in the pipeline are the major source of tribo-electrification of the conveyed solid particles.
2. Isolating electrically a portion of the concave surface of the elbow results in an eventual elimination of the tribo-electrification taking place at the elbow.
3. In addition to isolating a portion of the concave surface of the elbow, replacing the section with a material of adequate work function and/or surface resistivity, may further decrease the tribo-electrification occurring at the inside surfaces at the elbows.

It will be appreciated that the above description relates to the preferred embodiment by way of example only. Many variations are possible within the scope of the invention. For example, although it is preferable to have the electrically isolated portion located at the concave interior portion of an elbow of the pipeline, it is conceivable that the electrically isolated portions could be located anywhere along the pipeline. For example, in an alternative embodiment of the invention, the electrically isolated sections 15 are located in a spiral-sequenced configuration along a straight portion of the pipeline as shown in FIGS. 6–9.

Further variations on the invention will be obvious to those knowledgeable in the field. Such obvious variations are within the scope of the invention as described and claimed, whether or not expressly described.

What is claimed as the invention is:

1. In a pipeline for pneumatic conveying of particles, a method of reducing electrostatic charge buildup, comprising the step of providing an interior surface of said pipeline with at least one portion thereof which is electrically isolated from surrounding portions thereof and which is of a material having a different work function from that of conveyed particles, whereby said at least one portion acquires an electric charge of opposite polarity to that of conveyed particles, thereby reducing electrostatic charge buildup.

2. A method as recited in claim 1, where at least one of said electrically-isolated portions is on a concave inner surface of a bend in said pipeline.

3. A method as recited in claim 1, where at least one of said electrically-isolated portions is on a concave inner surface of a 90-degree elbow in said pipeline.

4. In a pipeline for pneumatic conveying of particles, the improvement wherein an interior surface of said pipeline is provided with at least one portion thereof which is electrically isolated from surrounding portions thereof and which is of a material having a different work function from that of conveyed particles, whereby said at least one portion acquires an electric charge of opposite polarity to that of conveyed particles, thereby reducing electrostatic charge buildup.

5. The improvement of claim 4, where at least one of said electrically-isolated portions is on a concave inner surface of a bend in said pipeline.

6. The improvement of claim 4, where at least one of said electrically-isolated portions is on a concave inner surface of a 90-degree elbow in said pipeline.

7. The improvement of claim 4, wherein said at least one electrically-isolated portion is replaceable.

8. The improvement of claim 4, wherein said at least one electrically-isolated portion is made of Teflon (trademark).

9. The improvement of claim 4, wherein said at least one electrically-isolated portion is made of stainless steel.

10. The improvement of claim 4, wherein said at least one electrically-isolated portion is made of a steel interior surface with an insulated superpolyamide plastic layer.

11. The improvement of claim 4, where a plurality of said electrically-isolated portions are interspersed in a spiral configuration along the interior surface of a straight portion of said pipeline.

* * * * *